United States Patent
John et al.

(10) Patent No.: US 7,277,007 B2
(45) Date of Patent: Oct. 2, 2007

(54) KEYLESS SMART START SYSTEM

(75) Inventors: Nantz John, Brighton, MI (US); Tom Tang, Novi, MI (US); Riad Ghabra, Dearborn, MI (US); Ronald King, Brownstown, MI (US); Thomas LeMense, Farmington, MI (US); Mike Fawaz, Plymouth, MI (US); David Hein, Sterling Heights, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/249,901

(22) Filed: May 16, 2003

(65) Prior Publication Data

US 2004/0227615 A1 Nov. 18, 2004

(51) Int. Cl.
*H04Q 19/00* (2006.01)

(52) U.S. Cl. .................. 340/5.61; 340/5.62; 340/5.63; 340/5.64; 340/5.31; 340/5.72; 340/426.3; 340/426.36; 340/426.16; 340/426.17; 307/10.5; 307/10.1; 307/10.3

(58) Field of Classification Search ............... 340/5.61, 340/5.62, 5.63, 5.64, 5.31, 5.72, 426.3, 825.72, 340/825.69, 426.36, 426.17; 307/10.5, 10.1, 307/10.3
See application file for complete search history.

(56) References Cited

U.S. PATENT DOCUMENTS

| | | | |
|---|---|---|---|
| 6,539,762 B1 * | 4/2003 | Wittwer | 70/423 |
| 6,624,744 B1 * | 9/2003 | Wilson et al. | 340/309.16 |
| 6,686,670 B1 * | 2/2004 | Weigl et al. | 307/10.5 |

* cited by examiner

*Primary Examiner*—Brian Zimmerman
*Assistant Examiner*—Venal Brown
(74) *Attorney, Agent, or Firm*—Earl LaFontaine

(57) ABSTRACT

An automotive keyless smart-start assembly 10 for use in an automobile 22 is provided including an automotive engine 18 having an operating condition and a stopped condition. An ignition controller 16, having a locked state and an unlocked state, is in communication with the automotive engine 18. A receptacle bin 20 is mounted to the automobile 22 and is in communication with the ignition controller 16. The receptacle bin 20 is movable between a closed position 34 and an open position 32. A portable electronic transmitter element 12, including a security code 14, communicates the security code 14 to the ignition controller 16 upon being positioned within the receptacle bin 20. The ignition controller 16 verifies the security code 14 and moves to the unlocked state upon verification. The receptacle bin 20 moves to the closed position 34 upon verification. An ignition button 19 is in communication with the ignition controller 16 and signals the ignition controller 16 to move the automotive engine 18 into the operating condition when the ignition controller 16 is in the unlocked state.

20 Claims, 6 Drawing Sheets

KEYLESS SMART START SYSTEM

BACKGROUND OF INVENTION

The present invention relates generally to an automotive ignition assembly and method and more specifically to an automotive ignition assembly and method utilizing integrated keyless features.

Traditional mechanical automotive features are ever constantly being updated and replaced with intelligent electronic counterparts within modern vehicles. The motivations for this evolution can come in a variety of fashions. Electronic assemblies allow for a smoother transition to additional features without the necessity of expensive design and manufacturing costs. These assemblies often allow the introduction of additional control and security features that may not be present in pure mechanical devices. Additionally, it is recognized that consumers often associate these electronic features with luxury or advanced technology and therefore place a premium on their presence within the vehicle during purchase decisions.

Although many such systems have been implemented within the vehicle with considerable degrees of success, many tradition mechanical assemblies have been largely left unevolved from their mechanical roots. Such may be argued is the case regarding automotive ignition assemblies. Although the actual ignition of the vehicle engine has evolved considerably, the activation of such a system commonly is dependent on the age-old technology of a mechanical key placed within a rotatable mechanical lock. Current immobilization chips have been integrated into the keys in order to improve security. These advancements, however, retain the fundamental mechanical structure of the physical key/lock mechanism. In this fashion they are tethered to the mechanical constraints associated with all mechanical systems.

The mechanical key/lock combination requires that the consumer mechanically engage the physical key to the lock structure. This commonly results in a key ring and fob that often hangs inconveniently from a portion of the automotive interior. Motion of the vehicle can impart undesired noise to the key fob and additional keys attached to the ring. Traditional key/lock mechanisms can be vulnerable to mechanical bypass. Existing mechanical systems can prove difficult to integrate into ever advancing automotive electronic based operations. Finally, such mechanical systems due to their longevity of usage can impart a standard feel to vehicle start up whereas a feeling of luxury or advancement may be desired for marketing reasons.

It would therefore be highly desirable to have a new paradigm introduced in regards to vehicle ignition systems. It would further be highly desirable to have a keyless automotive ignition assembly with the capability of sophisticated integration into vehicle electronics.

SUMMARY OF INVENTION

It is therefore an object of the present invention to provide an automotive keyless smart-start assembly that varied from traditional key/lock mechanisms. It is a further object of the present invention to provide automotive keyless smart-start assembly that allow for simple integration into vehicle electronics.

In accordance with the objects of the present invention an automotive keyless smart-start assembly for use in an automobile is provided. The automotive keyless smart-start assembly includes an automotive engine having an operating condition and a stopped condition. An ignition controller, having a locked state and an unlocked state, is in communication with the automotive engine. A receptacle bin is mounted to the automobile and is in communication with said ignition controller. The receptacle bin is movable between a closed position and an open position. A portable electronic transmitter element, including a security code, communicates the security code to the ignition controller upon being positioned within the receptacle bin. The ignition controller verifies the security and moves to the unlocked state upon verification. The receptacle bin moves to the closed position upon verification. An ignition button is in communication with the ignition controller and signals the ignition controller to move the automotive engine into the operating condition when the ignition controller is in the unlocked state.

Other objects and features of the present invention will become apparent when viewed in light of the detailed description and preferred embodiment when taken in conjunction with the attached drawings and claims.

DETAILED DESCRIPTION

Figure 1:
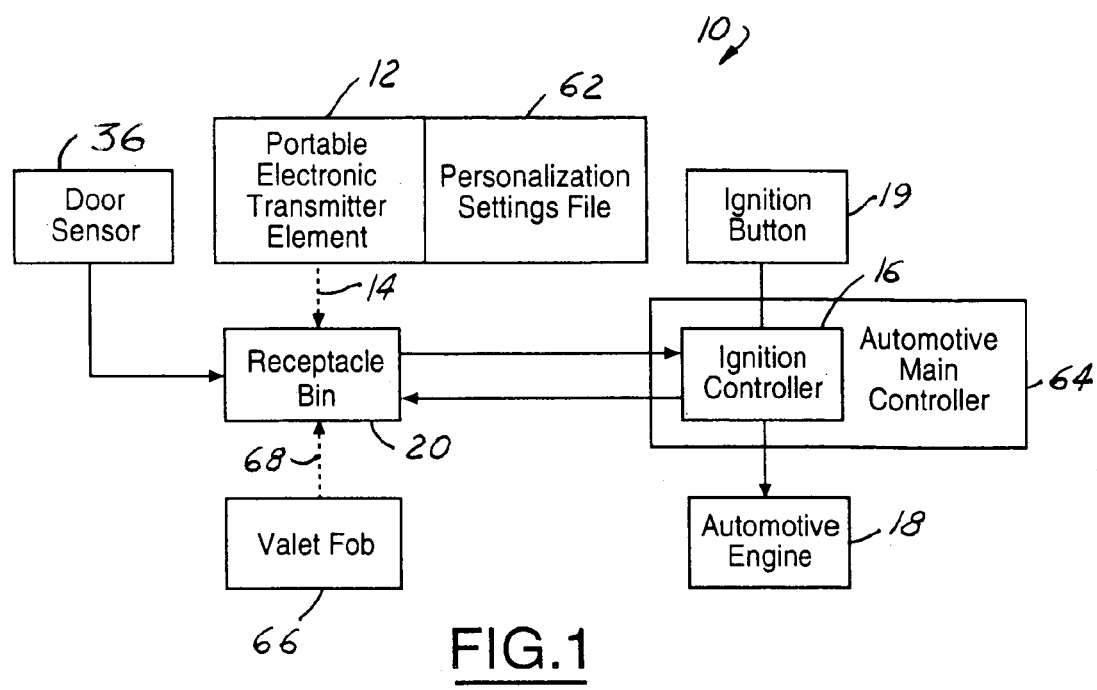
FIG. 1 is a block diagram of an automotive keyless smart-start assembly in accordance with the present invention.

Referring now to FIG. 1, which is a block diagram of an automotive keyless smart-start assembly 10 in accordance with the present invention. The present invention provides a unique and novel approach to replace traditional mechanical key/lock assemblies. The automotive keyless smart-start assembly 10 accomplished this through the use of a portable electronic transmitting element 12 that is utilized to transmit a security code 14 to an ignition controller 16 that is in communication with an automotive engine assembly 18. The ignition controller 16 is electronically movable between a locked state and an unlocked state. Upon verification of the security code 14 transmitted by the portable electronic transmitting element 12, the ignition controller 16 is moved into the unlocked state. From the unlocked state, the ignition controller 16 is capable of controlling the automotive engine assembly 18 such that it can be moved between an operating condition, wherein the engine is running, and a stop condition, wherein the engine is stopped. An ignition button 19 in communication with the ignition controller 16 provides the operator control over engine condition when the ignition controller 16 is in the unlocked state. Thus the mechanical key/lock mechanisms presently utilized to unlock the ignition are replaced with an electronic communication between the portable electronic transmitting element 12 and the ignition controller 16.

The present invention places the portable electronic transmitting element 12 in communication with the ignition controller 16 through the use of a receptacle bin 20 mounted to an automobile 22 and in communication with the ignition controller 16. The receptacle bin 20 may be mounted to the automobile 22 in a variety of locations within the interior (see FIG. 2). One embodiment contemplates the receptacle bin being positioned within the dash 24 of the automobile 22. The receptacle bin 20 preferably comprises a movable drawer element 26 containing a bin 28 or pocket. The bin 28 is formed such that the portable electronic transmitting element 12, preferably a fob, can be placed within it. The fob 12 communicates through wireless transmission with the ignition controller 16. An antenna assembly 30 can be integrated into the receptacle bin 20 to facilitate the communication with the fob 12 (see FIG. 3). Although a variety of antenna assemblies 30 may be utilized, one embodiment contemplates the use of a multi-axis antenna molded into the bin 28. Molded interconnect devices may be utilized in the formation of the antenna assemblies 30.

The portable electronic transmitting element 12, once placed in the bin 28, establishes communication through the antenna assembly 30 with the ignition controller 16. This communication preferably employs mutual, rolling, encrypted signaling. It is preferred that the communication can be established even if additional keys are attached to the fob 12 and such keys have imbedded transponders. In one embodiment the communication may employ inductive low-frequency communication link (for example 125 khz or 134 khz). In another embodiment a high-frequency communication link may be established (for example 13.56 Mhz). In still another embodiment, it is contemplated that the receptacle bin 20 can challenge the fob 12 using a low-frequency transmission and the fob 12 responds using an ultra-high-frequency response. In this embodiment, it is preferable to additionally include a backup transmission system in which low-frequency communication may be utilized when the fob 12 battery gets too low to support an ultra-high frequency response. It should be understood that such communication can be established with the fob 12 with or without the use of fob 12 batter power. In addition, it is contemplated that the backup transmission system can be implemented without the opening or closing of receptacle bin 20. It is further contemplated that the communication may incorporate smart label technology or blue tooth as a protocol for communication. Although several transmission embodiments have been described, it should be understood that a wide variety of communication protocols are contemplated by the present invention.

Figure 2:
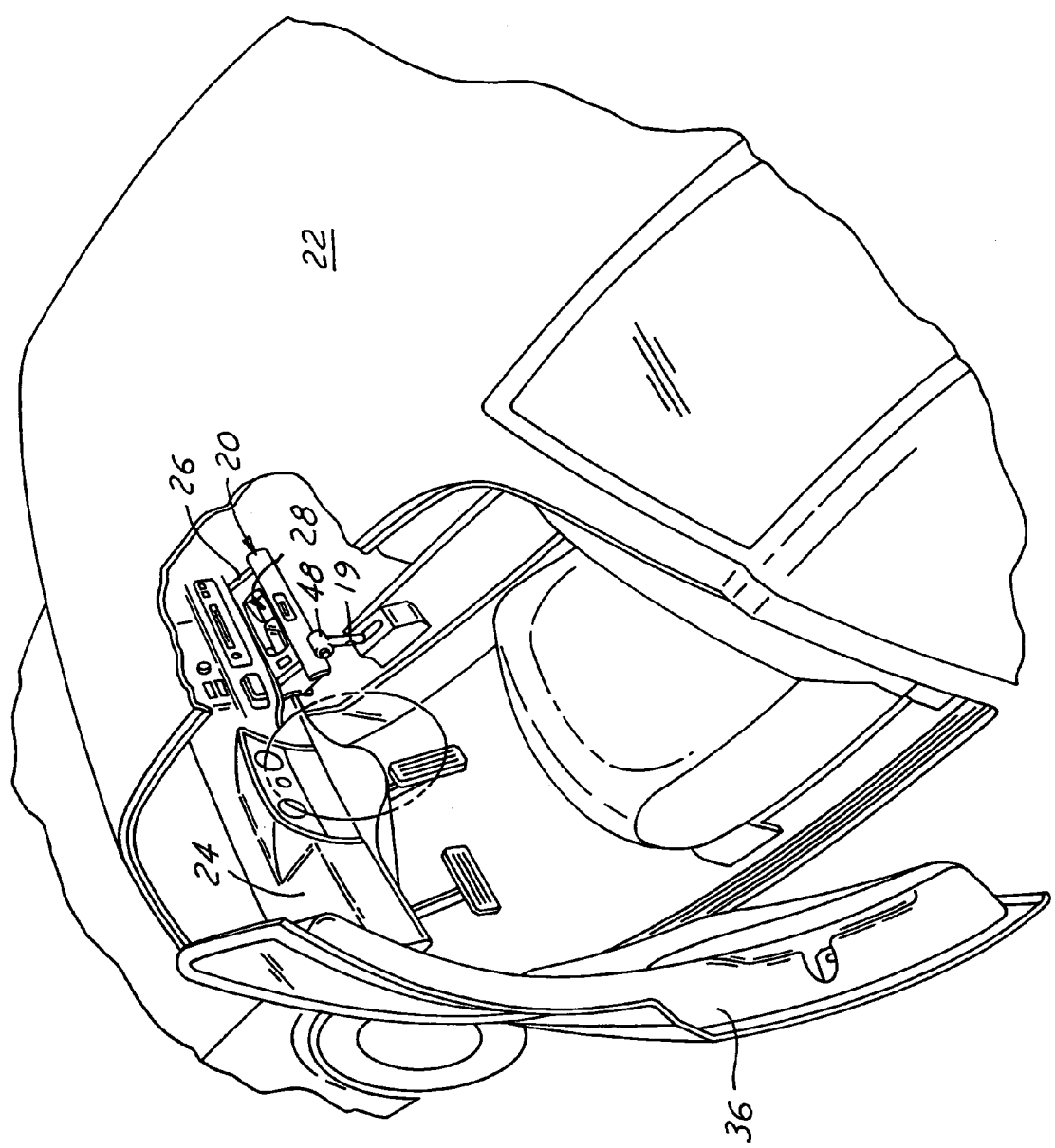
FIG. 2 is an illustration an automotive keyless smart-start assembly illustrated in FIG. 1, the receptacle bin illustrated in the open position.
Figure 3:
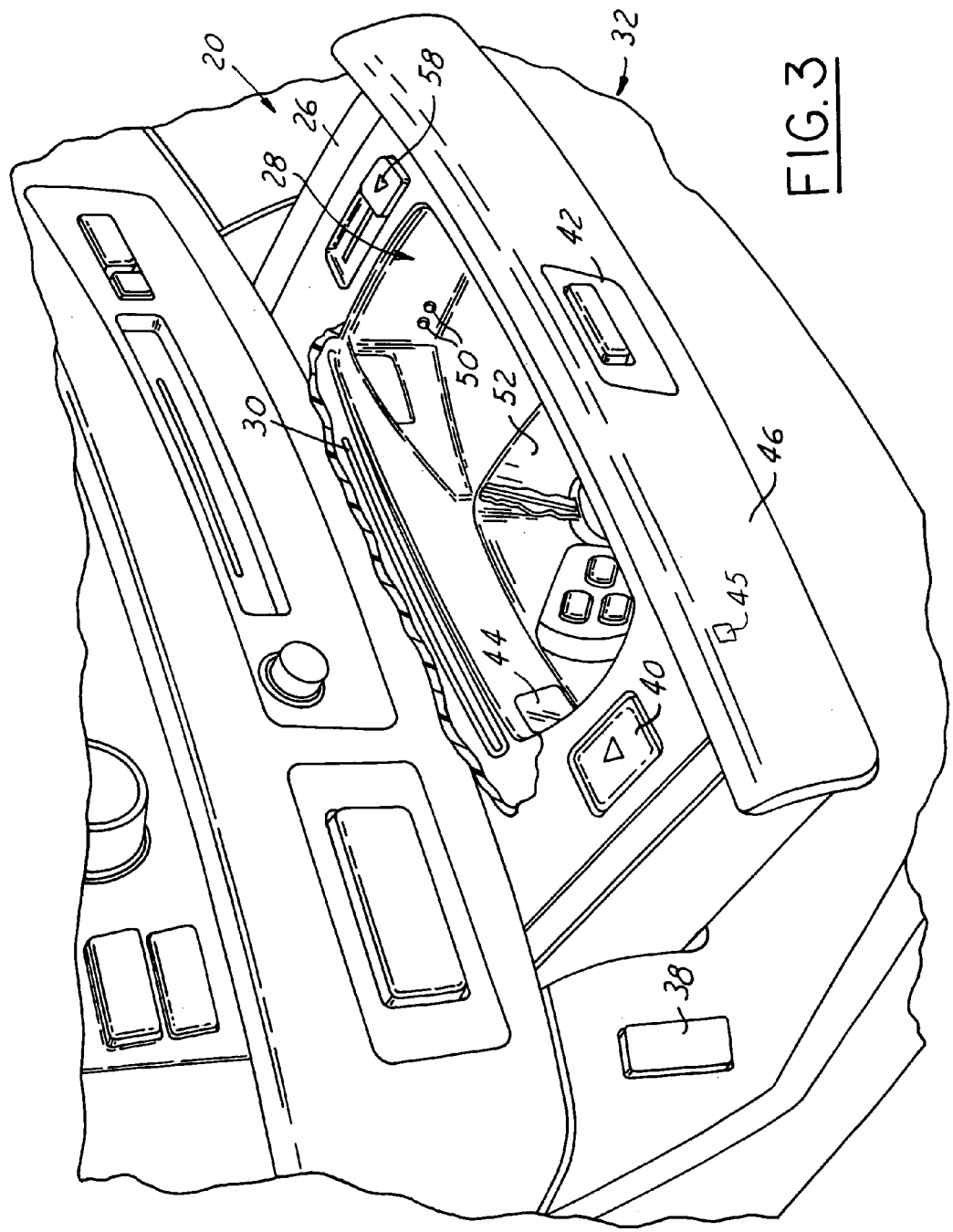
FIG. 3 is a detail of the illustration of an automotive keyless smart-start assembly illustrated in FIG. 1, the receptacle bin illustrated in the open position.
Figure 4:
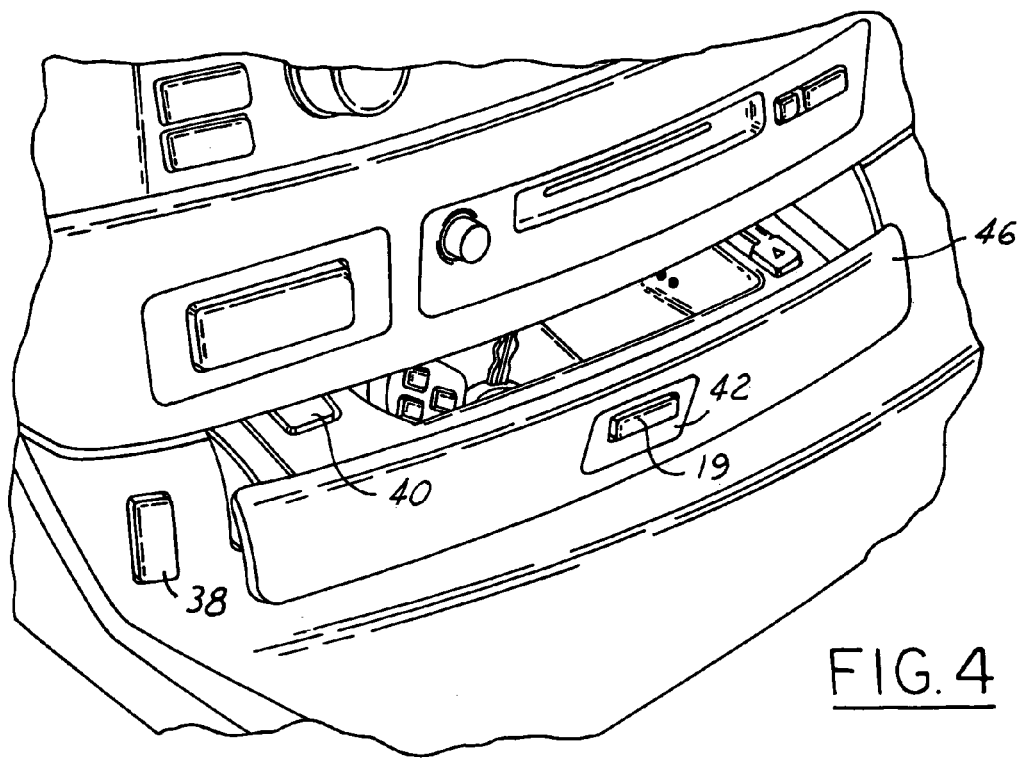
FIG. 4 is a detail of the illustration of an automotive keyless smart-start assembly illustrated in FIG. 1, the receptacle bin illustrated moving from the open position to the closed position.
Figure 5:
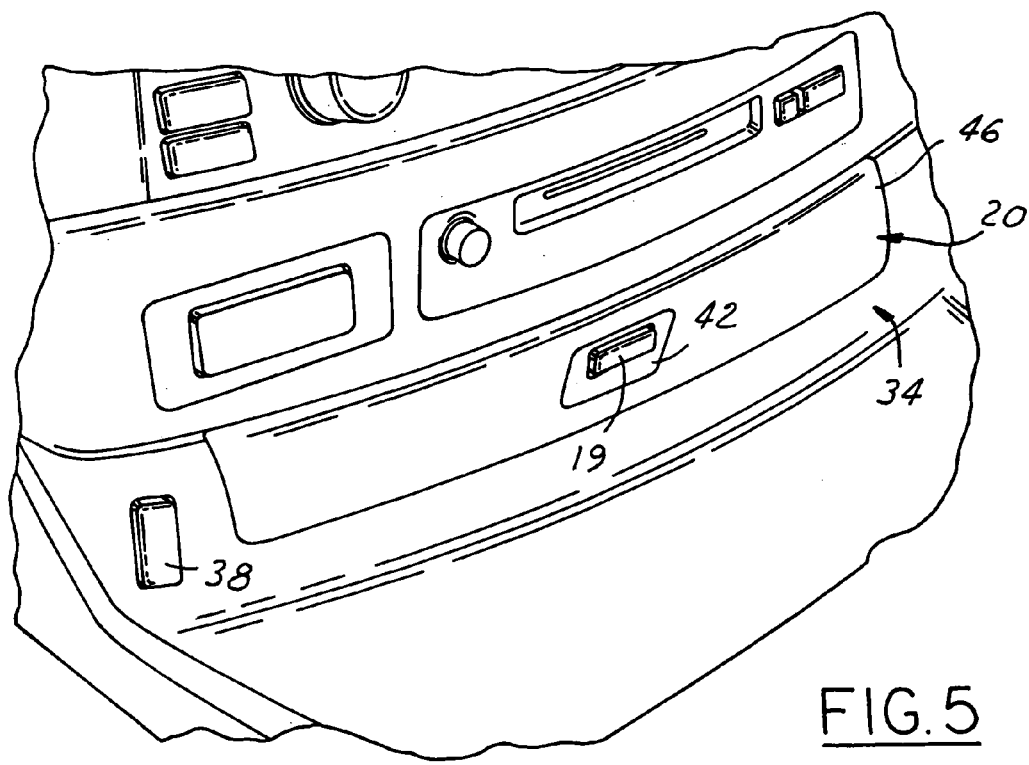
FIG. 5 is a detail of the illustration of an automotive keyless smart-start assembly illustrated in FIG. 1, the receptacle bin illustrated in the closed position.

The receptacle bin 20 is preferably electronically movable between an open position 32 as illustrated in FIGS. 2 and 3 and a closed position 34 illustrated in FIG. 5. The movement of the receptacle bin 20 into the closed position 34 prevents the portable electronic transmitting element 12 from being removed from the receptacle bin 20 during operation of the vehicle 22. Additionally, interior space within the vehicle 22 is maximized by having the receptacle bin 20 only in the open position 32 for the purposes of unloading/loading the portable electronic transmitting element 12. Although the movement of the receptacle bin 20 may be controlled in a variety of fashions, one embodiment is as follows. When a driver opens the vehicle door 36 (see FIG. 1), the receptacle bin 20 moves into the open position 32 if there is no portable electronic transmitting element 12 placed within. As soon as the receptacle bin 20 opens, it begins polling to look for communication with the portable electronic transmitting element 12. As soon as the portable electronic transmitting element 12 is placed within the receptacle bin 20, the ignition controller 16 receives and verifies the security code 14. The receptacle bin 20 moves into the closed position 34 upon successful completion of the verification process. In another embodiment, it is contemplated that the receptacle bin 20 may be moved into the open position 32 by pressing the ignition button 19 when the bin 28 is empty. Finally, in another embodiment, the receptacle bin 20 may be moved into the open position 32 when the bin 28 is full, by holding down the ignition button 19 after stopping the engine 18. Although it is intended that the receptacle bin 20 move by way of electronic control, the present invention contemplates the use of a manual eject button 38 that can override the electronic controls and move the receptacle bin 20 into the open position 32 without electronic power. This is useful for times in which power is not supplied to the key-less smart start assembly 10 or upon failure of any gearing mechanisms utilized to move the receptacle bin 20. By including a manual eject button 38, the fob 12 need not be trapped within the receptacle bin 20. It is further contemplated that the manual eject button 38 may be prevented from opening the receptacle bin 20 while the engine assembly 18 is operating. In this fashion, the fob 12 cannot be removed while the engine is running.

The receptacle bin may be moved into the closed position 34 in a variety of situations. As discussed, when the fob 12 is verified the receptacle bin 20 may automatically move into the closed position 34. The receptacle bin 20 may also be closed by pressing the ignition button 19. Closing and locking the vehicle door 36 may be utilized to signal the receptacle bin 20 to move to the closing position 34. The receptacle bin 20 may also be closed automatically after a pre-set period of time without a driver in the driver's seat. Finally, a close button 40 positioned within the receptacle bin 20 (see FIG. 1) and in communication with the receptacle bin 20 may be utilized to move to the closing position 34.

Once the fob 12 has been placed in the receptacle bin 20, the verification process is initiated. It is contemplated that the receptacle bin 20 may include an outer illumination panel 42. The outer illumination panel 42 can be utilized to indicate the status of the verification process. In one example the outer illumination panel 42 alternates colors to indicate status, such as blue for pending, red for verification failed, and green for verification approved. In anther embodiment, it is contemplated that the status of verification of the security code 14 may be conveyed in an audible fashion instead/in-addition to the visual cues. In this embodiment a vehicle "chime" cadence may be utilized to indicate code verification or approval. The implementation of such an audio indicator would be well within the skill of any automotive designer. The receptacle bin 20 may also include an internal illumination panel 44 (see FIG. 3) used to illuminate the bin 28 such that the fob 12 may be easily deposited or removed.

As stated, the present invention includes an ignition button 19 in communication with the ignition controller 16 such that when pressed, and the ignition controller 16 is in the unlocked state, the ignition controller 16 moves the engine assembly 18 into the operating condition. It is contemplated, however, that the ignition button 19 may also be utilized to alternately move the engine assembly 18 back and forth between the operating condition and the stopped condition. Although the ignition button 19 may be positioned anywhere within the vehicle 22, one embodiment contemplates locating the ignition button 19 on the front face 46 of the movable drawer element 26. In another embodiment, it is contemplated that the ignition button 19 may be positioned adjacent the gear shift 48 such that the vehicle may be started/stopped without removing the drivers hand from the gear shift 48. Although FIG. 2 illustrates the ignition button 19 mounted on the gear shift 48 stem, it should be understood that the term adjacent is meant to encompass the immediate vicinity around the gear shift 48 as well. It is noted, that in at least one embodiment, the ignition button is contemplated to be represented by the position of the gear shift 48 itself such that the vehicle engine assembly 18 is moved into the operating condition when the gear shift 48 is moved into gear. The ease with which the present invention allows for the vehicle 22 to be started or stopped may prove additionally fruitful as electric vehicles become prevalent and energy conservation becomes imperative. It is contemplated that the functioning of the ignition button 19 in combination with movement of the receptacle bin 20 may be configured by the user such that the operation of the keyless smart-start system 10 can be customized by individual users.

Figure 6:
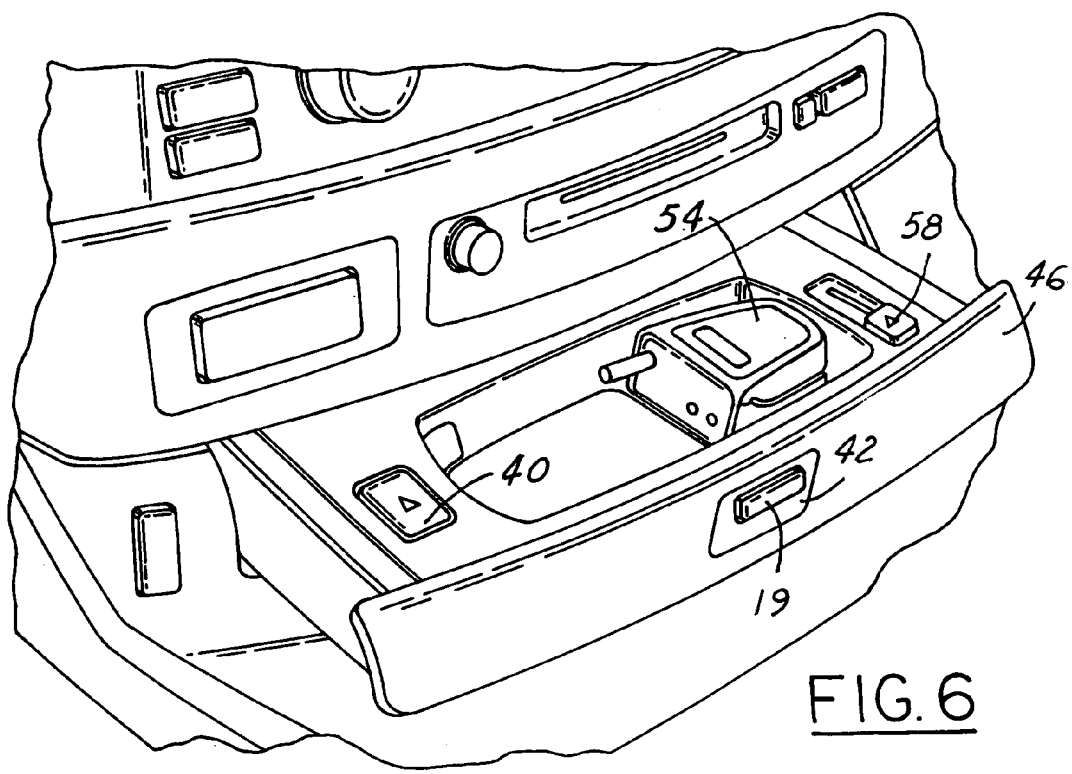
FIG. 6 is a detail of the illustration of an automotive keyless smart-start assembly illustrated in FIG. 1, the detail illustrating an alternate configuration of the portable electronic transmitter element.
Figure 7:
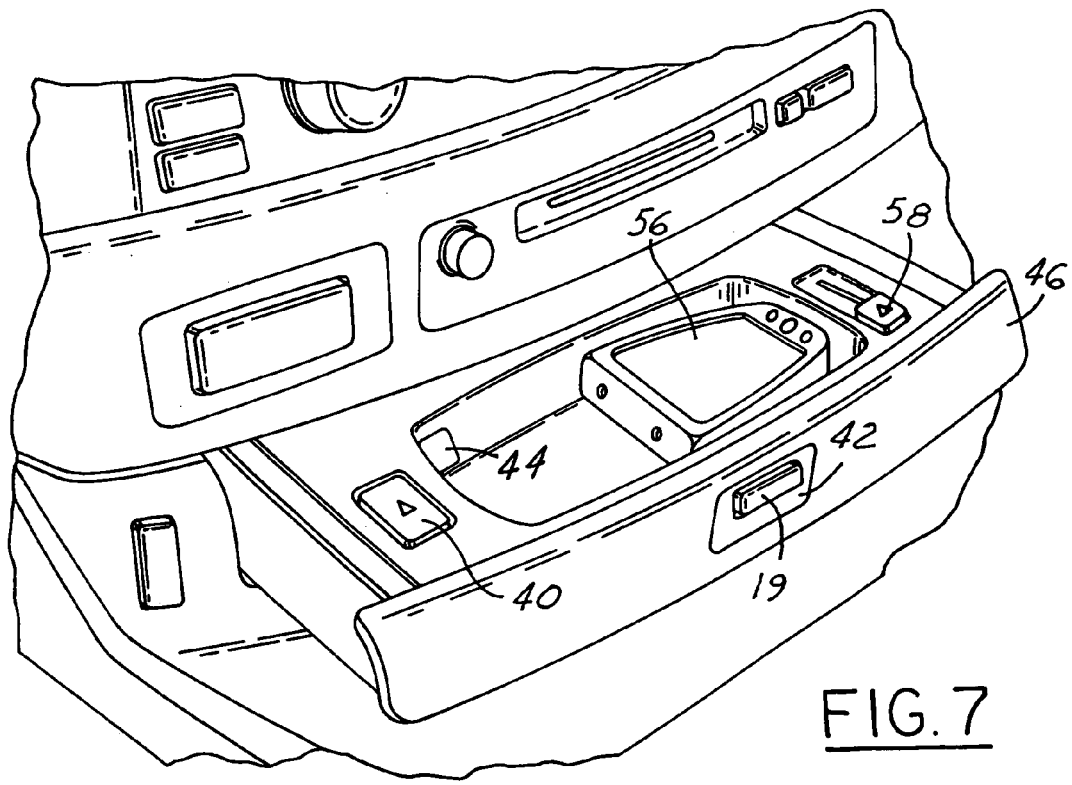
FIG. 7 is a detail of the illustration of an automotive keyless smart-start assembly illustrated in FIG. 1, the detail illustrating an alternate configuration of the portable electronic transmitter element.

The present invention also includes a plurality of features that further serve to increase its value towards vehicle operations. One embodiment contemplates the use of a recharging component 50 mounted within the bin 28 such that the portable electronic transmitting element 12 can be recharged while positioned in the bin 28. This can help reduce indents of poor transmission due to low battery power. The bin 28 may also include an anti-rattle component 52 such as a rubberized coating that helps minimize movement of the portable electronic transmitting element 12 within the bin 28 and the production of noise from such movement. The bin 28 itself may be formed so as to correspond to the shape of a unique portable electronic transmitting element 12. FIG. 6, for example, illustrates a portable electronic transmitting element 12 that is integrated into a cell phone 54. This reduces the requirement that a user carry and locate a separate fob 12. Similarly, in FIG. 7, illustrates a portable electronic transmitting element 12 that is integrated into a personal digital assistant 56. In both scenarios, the portable electronic transmitting element 12 is incorporated into a common component already carried by many people. Additionally, the recharging component 50 allows for common charging of the portable electronic transmitting element 12 and integrated device 54,56. In such situations wherein the integrated device 54,56 fills a substantial portion of the bin 28, it is contemplated that the receptacle bin 20 may include a remote ejection trigger 58 to assist in removing the portable electronic transmitting element 12 from the bin 28. The remote ejection trigger 58 is intended to be any mechanical lever that displaces the portable electronic transmitting element 12 within the bin 28 such that it can be easily gripped.

Figure 8:
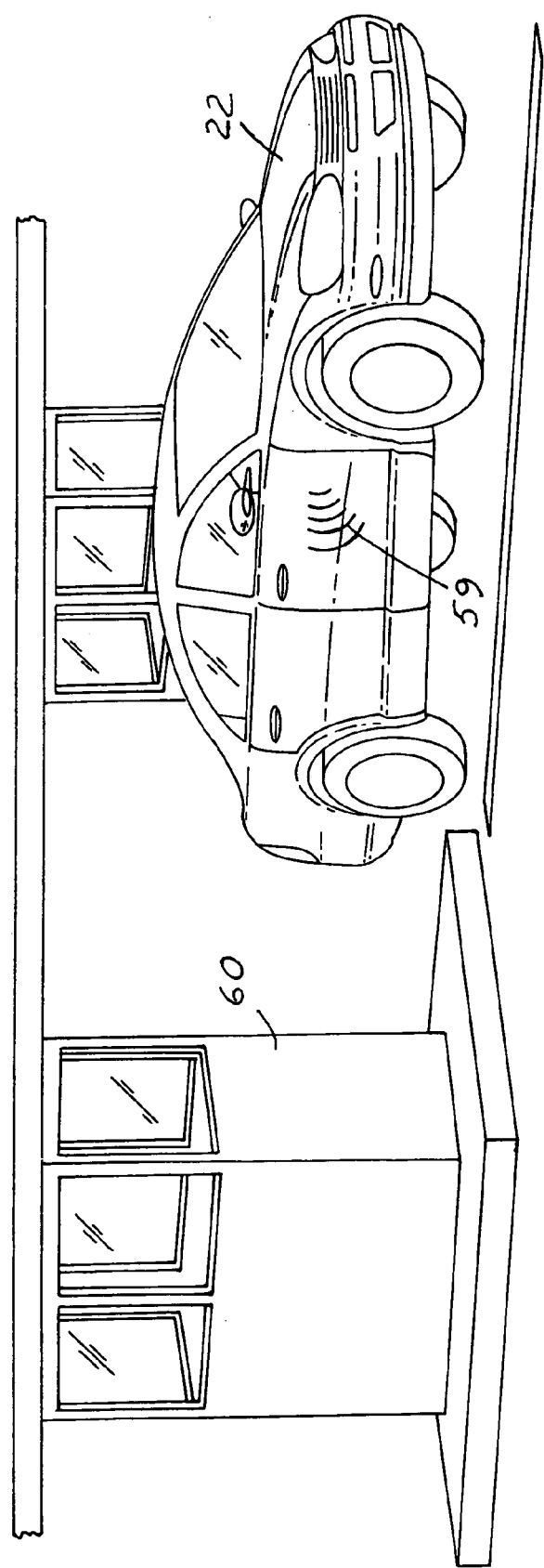
FIG. 8 is an illustration of an embodiment of an automotive keyless smart-start assembly in accordance with the present invention, the illustrating indicating a speed-pass feature integrated into the portable electronic transmitter element.

Another improvement of the present invention incorporates advanced features into the portable electronic transmitting element 12 such that it provides additional functions within the automobile 22. One such feature, depicted in FIG. 8, contemplates that portable electronic transmitting element 12 to be configured to include speed-pass technology transmissions 59 wherein the vehicle 22 may pass through toll booths 60 without the necessity of stopping. FIG. 1, also illustrates several other features. It is contemplated that the portable electronic transmitting element 12 may include a personalization settings file 62 containing a driver's complete list of preferences for automotive settings. In such an embodiment, it is contemplated that the ignition controller 16 be only a portion of an automotive main controller 64 such that numerous settings within the vehicle 22 may be adjusted to a driver's preferences when the portable electronic transmitting element 12 is placed within the bin 28. In this fashion, selections including seat position, radio presets, environmental control, steering wheel position, and other personalization settings can be instantaneously implemented for a given driver.

Finally, in such an embodiment, it is contemplated that the present invention may further include a valet fob 66 that may be placed within the bin 28 at restaurants or other valet situations. The unique advantage of the present invention is that the valet fob 66 can communicate a unique valet code 68 to the receptacle bin 20 and thus to the automotive main controller 64. This can institute a wide variety of features constituting a valet mode. The travel distance, acceleration, speed, along with other driving characteristics can all be limited by the automotive main controller 64 when in valet mode. Thus, the present invention allows for an expansion of controls through the use of an integrated electronic keyless smart-start system.

The present invention may further incorporate an accessory mode or state for use when automotive accessories, such as radio, lights, power, and other features, may be desired without the operation of the vehicle engine 18. Accessory modes are known to energize accessories within the vehicle without operating the vehicle engine 18. Present key-based systems have traditionally provided this function through a partial rotation of a key. The present invention can address the accessory mode through a variety of fashions. One embodiment, illustrated in FIG. 3 contemplates the use of an accessory mode button 45 positioned on the front face 46 of the movable drawer element 26 and in communication with the automotive main controller 64. This allows the accessory mode to be easily accessed by the driver/passengers. In one embodiment it is contemplated that the accessory mode button 45 may be operational only after verification of the security code 14. In other embodiments, however, it is contemplated that the accessory mode can be operated independent of security code 14 verification.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

The invention claimed is:

1. An automotive keyless smart-start assembly for use in an automobile comprising:
   an automotive engine having an operating condition and a stopped condition;
   an ignition controller in communication with said automotive engine, said ignition controller having a locked state and an unlocked state;
   a receptacle bin mounted to the automobile and in communication with said ignition controller, said receptacle bin movable between a closed position and an open position;
   a portable electronic transmitter element including a security code, said portable electronic transmitter element communicating said security code to said ignition controller upon said portable electronic transmitter element being positioned within said receptacle bin, said ignition controller verifying said security code, said ignition controller moving to said unlocked state upon verification of said security code, said receptacle bin moving to said closed position upon verification of said security code; and
   an ignition button in communication with said ignition controller, said ignition button signaling said ignition controller to move said automotive engine into said operating condition when said ignition controller is in said unlocked state.

2. An automotive keyless smart-start assembly as described in claim 1, wherein said ignition button signals said ignition controller to move said automotive engine into said stopped condition when said automotive engine is in said operating condition.

3. An automotive keyless smart-start assembly as described in claim 1, further comprising:
   a vehicle entrance door in communication with said receptacle bin, said receptacle bin moving into said open position when said vehicle entrance door is opened.

4. An automotive keyless smart-start assembly as described in claim 1, wherein said ignition button is positioned adjacent a gear shift element within the automobile.

5. An automotive keyless smart-start assembly as described in claim 1, further comprising:
   a recharging component positioned within said receptacle bin, said recharging component communicating with said portable electronic transmitter element when said portable electronic transmitter element is positioned within said receptacle bin.

6. An automotive keyless smart-start assembly as described in claim 1, further comprising:
   a manual eject button in communication with said receptacle bin, said manual eject button moving said receptacle bin into said open position without utilizing electric current.

7. An automotive keyless smart-start assembly as described in claim 6, wherein said manual eject button cannot move said receptacle bin into said open position while said automotive engine is in said operating condition.

8. An automotive keyless smart-start assembly as described in claim 1, further comprising:
   an anti-rattle component positioned within said receptacle bin, said anti-rattle component minimizing noise within said receptacle bin.

9. An automotive keyless smart-start assembly as described in claim 1, further comprising:
   an illuminated panel mounted on said receptacle bin, said illuminated panel indicating a status of said verification of said security code.

10. An automotive keyless smart-start assembly as described in claim 1, wherein said portable electronic transmitter element is integrated into a cell phone.

11. An automotive keyless smart-start assembly as described in claim 1, wherein said portable electronic transmitter element is integrated into a personal digital assistant.

12. An automotive keyless smart-start assembly as described in claim 1, wherein a speed pass transmitter is integrated into said portable electronic transmitter element.

13. An automotive keyless smart-start assembly as described in claim 1, further comprising:
   an automotive personalization settings file stored in said portable electronic transmitter element; and
   an automotive main controller in communication with said receptacle bin, said automotive main controller receiving said automotive personalization settings file from said portable electronic transmitter element when said portable electronic transmitter element is positioned in said receptacle bin.

14. An automotive keyless smart-start assembly for use in an automobile comprising:
   an automotive engine having an operating condition and a stopped condition;
   an ignition controller in communication with said automotive engine, said ignition controller having a locked state and an unlocked state;
   a receptacle bin mounted to the automobile and in communication with said ignition controller;
   a portable electronic transmitter element including a security code, said portable electronic transmitter element entering communication with said receptacle bin and communicating said security code to said ignition controller upon said portable electronic transmitter element being positioned within said receptacle bin, said ignition controller verifying said security code, said ignition controller moving to said unlocked state upon verification of said security code; and
   an ignition button in communication with said ignition controller, said ignition button signaling said ignition controller to move said automotive engine into said operating condition when said ignition controller is in said unlocked state.

15. An automotive keyless smart-start assembly as described in claim 14, further comprising:
   a valet fob transmitter element including a valet code, said valet fob transmitter element communicating said valet code to said ignition controller upon said valet fob transmitter element being positioned within said receptacle bin, said ignition controller verifying said valet code, said ignition controller moving to said unlocked state upon verification of said valet code; and
   an automotive main controller in communication with said receptacle bin, said automotive main controller receiving said valet code from said valet fob transmitter element when said valet fob transmitter element is positioned in said receptacle bin, said automotive main controller entering a valet mode upon receiving said valet code.

16. An automotive keyless smart-start assembly as described in claim 14, wherein said receptacle bin communicates to said portable electronic transmitter element using low-frequency transmissions, said portable electronic transmitter element communicates to said receptacle bin using ultra-high-frequency transmissions.

17. An automotive keyless smart-start assembly as described in claim 16, further comprising:
   a backup transmission system wherein said portable electronic transmitter element communicates to said receptacle bin using low-frequency transmissions.

18. An automotive keyless smart-start assembly as described in claim 14, further comprising:
   an accessory code button in communication with an automotive main controller; said accessory code button placing said automotive main controller in an accessory mode.

19. A method of starting an automotive engine comprising:
   placing a portable electronic transmitter element within a receptacle bin positioned within an automobile;
   communicating a security code from said portable electronic transmitter element to said receptacle bin;
   communicating said security code to an ignition controller in communication with the automotive engine, said ignition controller having a locked state and an unlocked state;
   verifying said security code;
   moving said ignition controller to said unlocked state upon verification of said security code;
   activating the automotive engine upon the pressing of an ignition button if said ignition controller is in said unlocked state.

20. A method of starting an automotive engine as described in claim 19, further comprising:
   moving said receptacle bin from an open position to a closed position upon verification of said security code.

* * * * *